Sept. 8, 1925.

P. EVERSHEIM 1,552,686

ELECTRIC RESISTANCE COILS FREE FROM INDUCTION AND CAPACITY

Filed Jan. 3, 1924

Patented Sept. 8, 1925.

1,552,686

UNITED STATES PATENT OFFICE.

PAUL EVERSHEIM, OF BONN-ON-THE-RHINE, GERMANY, ASSIGNOR TO RINGSDORFF-WERKE A.-G., OF MEHLEM-ON-THE-RHINE, GERMANY, A CORPORATION OF GERMANY.

ELECTRIC RESISTANCE COILS FREE FROM INDUCTION AND CAPACITY.

Application filed January 3, 1924. Serial No. 684,224.

*To all whom it may concern:*

Be it known that I, PAUL EVERSHEIM, residing at Bonn-on-the-Rhine, in the State of Prussia, Germany, have invented certain new and useful Improvements in Electric Resistance Coils Free from Induction and Capacity, of which the following is a specification.

Electrical resistance coils free from capacity are in themselves known. They are usually characterized by the wire windings being arranged so that the separate windings cross. This construction is only applicable for relatively fine wires, and only then if it is possible to wind the windings on a solid core.

According to the invention resistance coils free from induction and capacity can be manufactured by winding two like coils formed of a conductor of any required cross section, the one right handed and the other left handed, radially inserted in one another, to alternate the rings of the respective coils, and connected so that adjacent coils are traversed by currents in opposite directions.

The invention works most efficiently by the use of a material in ribbon or band form which in known manner is wound on edge. Such edge wound coils are in themselves known, but could not formerly be wound as resistances free from induction and capacity. According to the invention the required object is effected in a very simple manner by clamping means introduced into the core of the coils inserted in one another, the clamping means being applied externally against the sharp edges of the bands and thereby holding the coils in their position.

Figure 1:
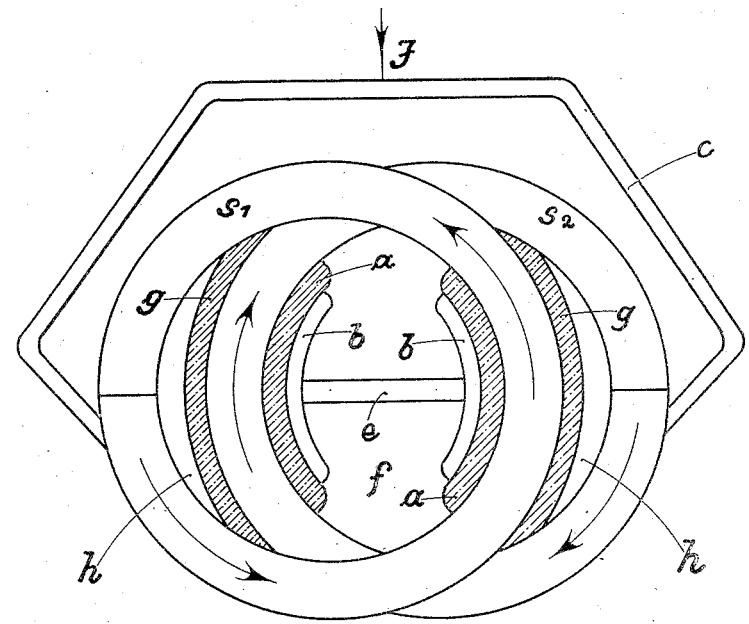
Figure 2:
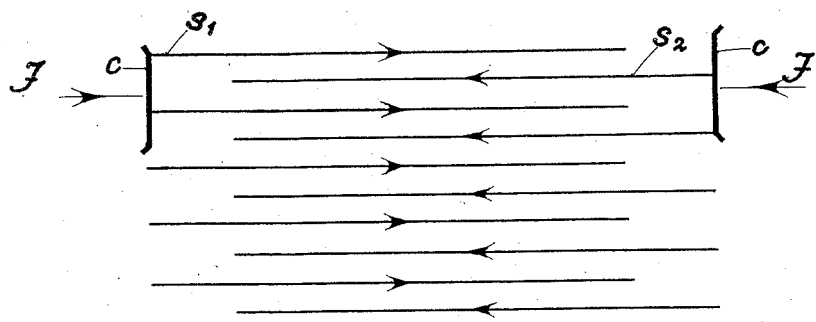

An example of a construction according to the invention is shown in the accompanying drawing, in which Fig. 1 is a front view of a coil and Fig. 2 a plan of the winding scheme of the coils.

The whole coil consists of two separate helical coils $s_1$ and $s_2$ which, as indicated by the arrows, are wound in opposite directions. The winding of the separate coils is effected in known manner and the wound coils are then, as shown in Fig. 1, laterally inserted in one another in the radial direction so that the separate coils will alternate with each other. A hollow core $f$ remains in the centre between the coils. In this core clamping means are introduced, for example curved strips $a$ of asbestos, which are pressed by means of sheet metal strips $b$, also curved, and a rod $e$ pressed against the inner edges of the coils. The coils are also held together by means of strips $g$, also made of insulating material, inserted between the inner and outer circumference of the two coils in the intermediate space $h$. The insulating strips $a$ and $g$ are preferably made of an elastic material, for example asbestos. They penetrate into the sharp edges of the edge wound strips and so maintain the windings rigidly in position.

The two coils are inserted in one another so that the windings are substantially enclosed one by the other. If a current F is introduced by means of an arc shaped conductor $c$, current traverses the coil $s_1$ to the left and the coil $s_2$ to the right. By this arrangement self-induction is excluded as in a bi-filar winding. The new arrangement has, however, the advantage as compared to a bi-filar winding that the capacity is exceedingly small, practically zero, for the following reasons:

It is known that the charge of a condenser is dependent on the value of the potential between the coatings. If this is very small, the charge also must be correspondingly small. Since in the present case the two coils are connected together in parallel, between two windings there can only be the small potential difference due to the fall of potential in one winding. There is also the further advantage that between the separate layers of resistance only a very small layer of insulation is required in order to prevent the passage of the current from one winding to the other. In one very simple construction, the usually formed external skin of oxide is sufficient.

The invention, therefore, enables resistances free from induction and capacity to be constructed which have, moreover, the advantage of considerable durability and low cost. The resistances made according to the invention can be employed directly as slide resistances, but can also be used for other suitable purposes.

Having now particularly described and ascertained the nature of my said invention and in what manner the same is to be performed, I declare that what I claim is:—

1. An electric resistance free from induction and capacity, consisting of coils of the same dimensions to offer the same resistance, wound the one right and the other left, made of a conductor of any required cross section, the coils being inserted in one another to overlap the rings of the coils and connected in multiple arc so that neighbouring windings are traversed by currents in opposite directions.

2. In the structure recited in claim 1, an insulator support extending through all the rings of both coils.

3. An electric resistance, free from induction and capacity according to claim 1, in which the two coils consist of a ribbon or band material wound edgewise in known manner.

In testimony whereof I affix my signature.

Dr. PAUL EVERSHEIM.